Figures 1, 2, 3:
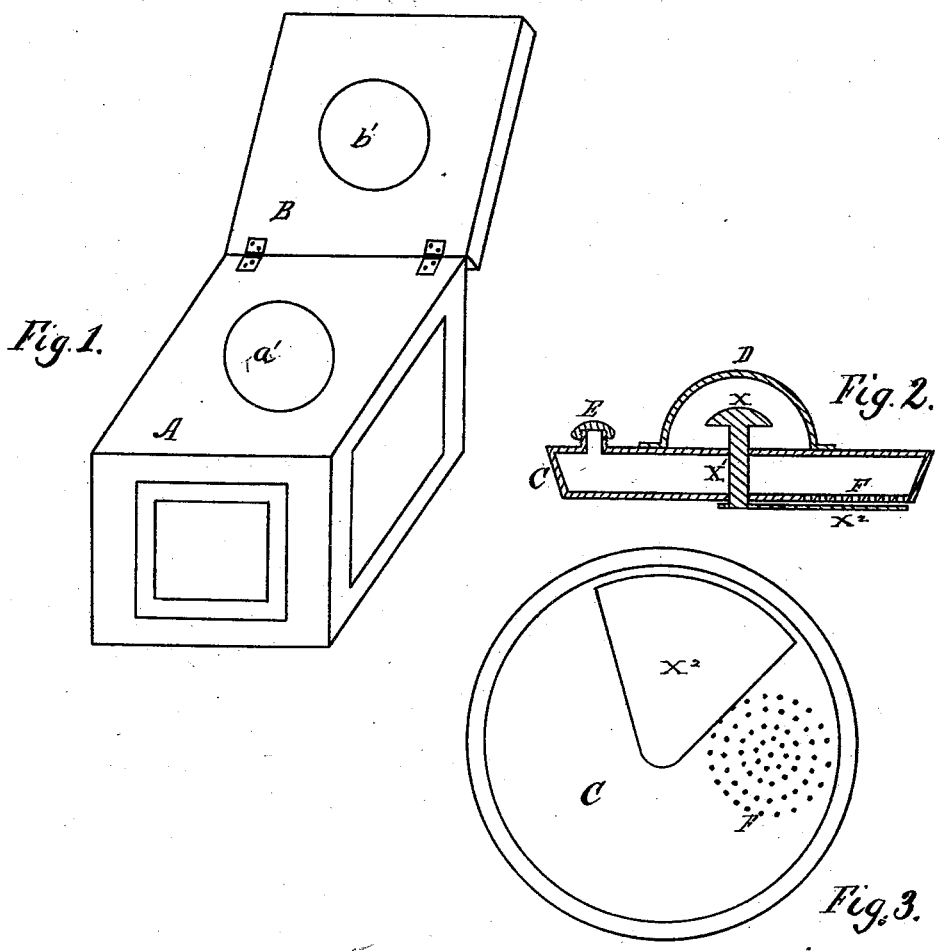

(No Model.)

H. P. STICHTER.
COMMODE.

No. 253,954. Patented Feb. 21, 1882.

ATTEST:
Wm. A. Womer
George W. Bock

INVENTOR:
Henry P. Stichter
By [signature]
Attorney.

UNITED STATES PATENT OFFICE.

HENRY P. STICHTER, OF POTTSVILLE, PENNSYLVANIA.

COMMODE.

SPECIFICATION forming part of Letters Patent No. 253,954, dated February 21, 1882.

Application filed March 1, 1881. (No model.)

*To all whom it may concern:*

Be it known that I, HENRY P. STICHTER, of Pottsville, county of Schuylkill and State of Pennsylvania, have invented a new and useful Improvement in Commodes, of which the following is a specification.

This invention is an improvement on Letters Patent No. 233,890, issued November 2, 1880, to the subscriber.

My invention relates to commodes having excrement-receptacles and covered by a lid or cover; and my object is to provide a lid containing disinfecting compound and a suitable place in the commode body or casing to place said lid or cover when not placed over the excrement-receptacle, and also an arrangement of said lid or cover which enables it to be used as a dredge for discharging the disinfecting compound.

My mode of construction is shown in the accompanying drawings, in which similar letters of reference indicate like parts, and in which—

Figure 1 is a front view of a commode; Fig. 2, a section of my lid or cover, and Fig. 3 a bottom view of the same.

A is the body of a commode; $a'$, the hole under which the excrement-vessel is placed. B is the lid of the commode body, and $b'$ is a hole therein corresponding in size with $a'$, and in which the lid or cover C is to be placed when not in $a'$. The lid or cover C is a hollow vessel having the handle D, the opening with screw-cap at E, and having the bottom perforated at F, the whole lid fitting in the holes $a'$ and $b'$. I perforate only a portion of the bottom, as shown in Fig. 3, and I provide a sliding cover, $X^2$, to cover or uncover the perforations. This cover is operated by the knob X placed under the handle D, the knob X being connected with the cover $X^2$ by the shaft $X'$. By turning the knob the perforations are covered or uncovered at will. I fill the lid or cover C through the opening E with a disinfecting compound in form of a powder and it is ready for use. The perforations are uncovered by turning the knob X, and the cover C is used as a dredge, the disinfecting compound being discharged through the perforations F. The cover C is made to fit the hole $a'$ closely, so that while the commode is not being used all offensive oders will be prevented from escaping from the commode. The hole $b'$ is merely a temporary resting-place for the cover C, and its use will prevent the necessity of laying the cover C on the floor and avoid spilling the powder contained in it.

In many cases the cover C can be used without having any cover, as $X^2$, for the perforations; but the use of this cover $X^2$ prevents the possibility of spilling the contents of the cover C, and also prevents the powder contained therein from absorbing moisture.

The lid or cover C may be made of any suitable material and of any size or shape to conform to the size and shape of the commode. Any disinfecting-powder may be used in the cover that will discharge through the perforations.

What I claim is—

1. In the disinfecting lid or cover for commodes herein described and constructed as shown, the combination of the receptacle for holding a disinfecting-powder, having a partly perforated bottom at F, the perforations being covered by a sliding cover, $X^2$, which is operated by means of a stem, $X'$, and knob X, the handle D, and screw-cap E, all substantially as set forth.

2. In the commode herein shown and described, the disinfecting lid or cover, in combination with the commode-case, having a cover provided with the opening $b'$, adapted to receive the disinfecting-lid when not in use.

HENRY P. STICHTER.

Witnesses:
JOSEPH JOHNSTON,
DANL. LARER.